(12) United States Patent
Maeda et al.

(10) Patent No.: US 9,860,608 B2
(45) Date of Patent: Jan. 2, 2018

(54) ADVERTISEMENT DISTRIBUTION SYSTEM

(71) Applicant: DeNA Co., Ltd., Tokyo (JP)

(72) Inventors: Yuji Maeda, Tokyo (JP); Yasunobu Sasaki, Tokyo (JP)

(73) Assignee: DeNA Co., Ltd., Tokyo (JP)

(*) Notice: Subject to any disclaimer, the term of this patent is extended or adjusted under 35 U.S.C. 154(b) by 0 days.

(21) Appl. No.: 15/060,349

(22) Filed: Mar. 3, 2016

(65) Prior Publication Data
US 2016/0261926 A1 Sep. 8, 2016

(30) Foreign Application Priority Data
Mar. 4, 2015 (JP) .................. 2015-042283

(51) Int. Cl.
| | |
|---|---|
| H04N 7/10 | (2006.01) |
| H04N 7/025 | (2006.01) |
| H04N 21/81 | (2011.01) |
| H04N 21/2547 | (2011.01) |
| H04N 21/262 | (2011.01) |
| G06Q 30/02 | (2012.01) |
| H04N 21/222 | (2011.01) |

(52) U.S. Cl.
CPC .......... *H04N 21/812* (2013.01); *G06Q 30/02* (2013.01); *H04N 21/222* (2013.01); *H04N 21/2547* (2013.01); *H04N 21/262* (2013.01)

(58) Field of Classification Search
CPC ............. H04N 21/812; H04N 21/4532; H04N 21/4316; H04N 21/4622; H04N 21/25891; H04N 21/2665; G06Q 30/0251
See application file for complete search history.

(56) References Cited

U.S. PATENT DOCUMENTS

| | | | | |
|---|---|---|---|---|
| 2003/0058707 A1* | 3/2003 | Dilger | .................... | G06Q 30/02 365/200 |
| 2003/0070167 A1* | 4/2003 | Holtz | ................ | G06F 17/30017 725/32 |
| 2007/0157228 A1* | 7/2007 | Bayer | .................... | G06Q 30/02 725/34 |
| 2007/0174125 A1* | 7/2007 | Poole | .................... | G06Q 30/02 705/14.66 |
| 2008/0276266 A1* | 11/2008 | Huchital | ................ | G06Q 30/02 725/32 |
| 2009/0049469 A1* | 2/2009 | Small | .................... | H04H 20/82 725/35 |
| 2009/0172727 A1* | 7/2009 | Baluja | .................... | G06Q 30/00 725/34 |

(Continued)

*Primary Examiner* — Jason Salce

(74) *Attorney, Agent, or Firm* — Procopio, Cory, Hargreaves & Savitch LLP

(57) ABSTRACT

An advertisement distribution system executes a first step in which a server requests that a distributor client submit advertisements, a second step in which the advertisements submitted by the distributor client are provided to an advertiser client according to the request, a third step in which the advertisement that is employed from among the provided advertisements is received by the advertiser client, and the server is notified by the advertiser client, a fourth step in which a video is received from the distributor client by the server, and a fifth step in which the server distributes the video received from the distributor client, and provides the employed advertisement at a specific timing in the distribution of the video.

5 Claims, 9 Drawing Sheets

(56) References Cited

U.S. PATENT DOCUMENTS

2010/0299715 A1* 11/2010 Slothouber .......... H04N 21/235
                                                   725/118
2014/0259049 A1*  9/2014 Wang ................... H04N 21/812
                                                    725/32

* cited by examiner

| Identification information for specifying item | #001 |
|---|---|
| Identification information for specifying advertiser | A001 |
| Merchandise or service to be advertised | Camera |
| Desired play time for advertising video | 1'30" |
| Range of advertising target | Men in their 20s |
| Advertising fee payment bank account | 567-8901234 |

FIG. 7

| Identifier | Site account | Bank account |
|---|---|---|
| B001 | http://www.abcd/x | 012 3456789 |
| B002 | http://www.efgh/y | 123 4567890 |
| B003 | http://www.ijkl/z | 234 5678901 |

FIG. 8

| Advertisement identification number | Item identification number | Advertiser identification information | Advertising video distribution period | Link information | Distributor identification information | Video data | Evaluation points |
|---|---|---|---|---|---|---|---|
| X001 | #001 | A001 | Feb. 1, 2015 to Feb. 28, 2015 | http://... | B001 | D001.mpg | 206 |
| X002 | #001 | A001 | Feb. 1, 2015 to Mar. 31, 2015 | http://... | B002 | http://... | 1562 |
| X003 | #002 | A002 | Feb. 1, 2015 - Feb. 15, 2015 | http://... | B001 | D002.mpg | 25 |

FIG. 9

ADVERTISEMENT DISTRIBUTION SYSTEM

The present application claims the benefit of Japanese Patent Application No. JP2015-042283, filed on Mar. 4, 2015, the content of which is incorporated herein in its entirety by reference.

BACKGROUND

1. Field

The present invention relates to an advertisement distribution system.

2. Related Art

Technology has been disclosed that offers a platform for matching businesses that want to advertise on a social network service or the like with creators who want to undertake the work of creating advertisements, and that allows for the online ordering and distribution of banner images and other such advertising materials (Non-Patent Document 1).

PRIOR ART DOCUMENT

Non-Patent Document

[Non-Patent Document 1]
http://www.excite.co.jp/News/column_g/20141201/Cobs_086615.html

SUMMARY OF THE INVENTION

Problems to be Solved by the Invention

Conventional advertising is distributed to unspecified persons, with no relation between the creator offering the advertising material and the distributor that distributes the advertising, so that advertising material that is of interest to the viewer who views the advertising cannot be properly distributed, and the effect of the advertising distribution is uncertain.

SUMMARY

A mode of the present invention is an advertisement distribution system that executes: a first step in which a distribution server requests that a distributor client submit advertisements; a second step in which the advertisements submitted by the distributor client are provided to an advertiser client according to the request; a third step in which the advertisement that is employed from among the provided advertisements is received by the advertiser client, and the distribution server is notified by the advertiser client; a fourth step in which a video is received from the distributor client by the distribution server; and a fifth step in which the distribution server distributes the video received from the distributor client, and provides the employed advertisement at a specific timing in the distribution of the video.

It is preferable here if there are a plurality of distributor clients.

Also, in the fifth step, it is preferable that the employed advertisement is provided either before the distribution, during the distribution, or before the end of the distribution of the video.

Also, in the fifth step, it is preferable that the distributor client receives an operation for providing an advertisement, and the distribution server provides the employed advertisement at the point of having received information indicating that said operation came from the distributor client.

Also, in the fifth step, it is preferable that the distribution server receives a request to view an advertisement from the viewer of the video, and provides the employed advertisement in response to this request.

Also, in the fifth step, it is preferable that the employed advertisement is provided before the end of distribution of the video, and said advertisement seeks to have the viewer access a particular website.

Also, it is preferable if there is a sixth step in which an advertising fee is paid to the person who submitted the advertisement, according to the number of viewers who have viewed the advertisement provided in the fifth step.

Effect of the Invention

With the present invention, advertising material that is of interest to the viewer who views the advertisement can be properly distributed.

BRIEF DESCRIPTION OF THE DRAWINGS

FIG. 7 A diagram of an example of the registration of an advertising item database in an embodiment of the present invention.

FIG. 8 A diagram of an example of the registration of a distributor database in an embodiment of the present invention.

FIG. 9 A diagram of an example of the registration of an advertising material database in an embodiment of the present invention.

DETAILED DESCRIPTION

Figure 1:
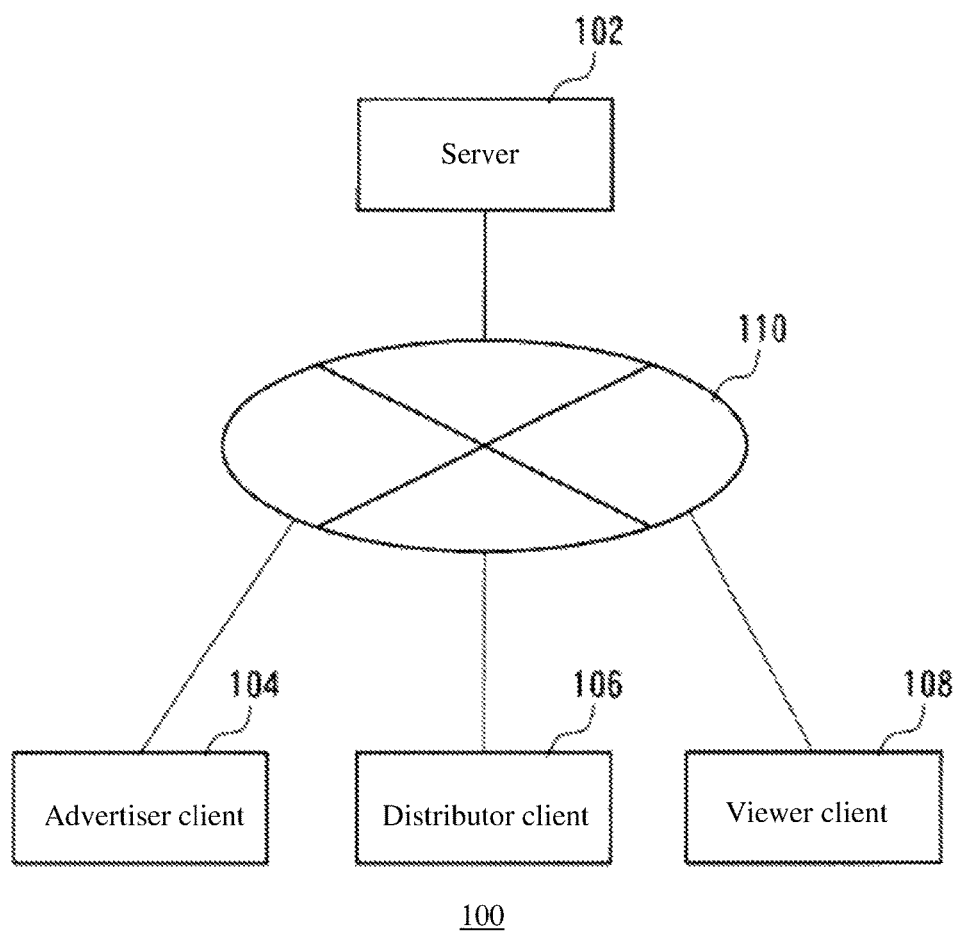
FIG. 1 A diagram of the configuration of the advertisement distribution system in an embodiment of the present invention.

As shown in FIG. 1, the advertisement distribution system 100 in an embodiment of the present invention is made up of a server (distribution server) 102, an advertiser client 104, a distributor client 106, and a viewer client 108. The server 102, the advertiser client 104, the distributor client 106, and the viewer client 108 are connected so as to be able to exchange information via the Internet or another such information communication network 110.

In this embodiment, an advertisement is distributed as follows. A request for an advertisement is made from the advertiser client 104 to the server 102, advertisements are solicited from the server 102 to the distributor client 106 according to this request, and advertising material authenticated by the advertiser client 104 from among the advertising materials provided by the distributor client 106 is distributed to the viewer client 108. At this point, the provision of an advertisement is performed by using a video distribution site that provides non-advertising video from the distributor client 106. Specifically, the distributor client 106 that has subscribed to advertising material coincides with the distributor client 106 that provides video and advertising. In FIG. 1, one of each of the advertiser client 104, the distributor client 106, and the viewer client 108 is mentioned, but two or more of each may be used instead.

Also, in this embodiment, it is assumed that the advertising is provided by video, and the advertising material is described as advertising video. The applicable scope of the present invention, however, is not limited to advertising video, and may encompass still pictures, audio, text, or other such advertising material.

Figure 2:
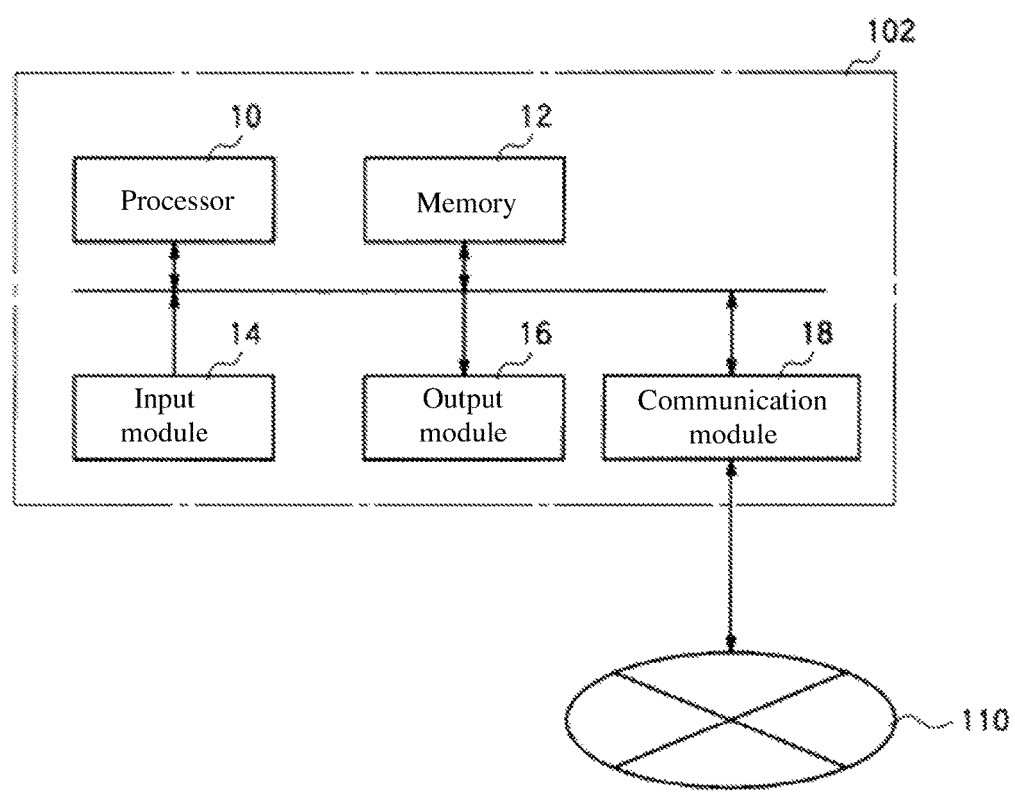
FIG. 2 A diagram of the configuration of the server in an embodiment of the present invention.

As shown in FIG. 2, the server 102 includes a processor 10, a memory 12, an input module 14, an output module 16, and a communication module 18. The server 102 comprises the basic elements of a computer. The processor 10 includes a means for performing computation processing, such as a CPU. The processor 10 performs the functions of a video distribution site in the server 102 by executing software (e.g., non-transitory computer readable medium having machine-executable instructions with which a computer having a storage and a hardware processor) stored in the memory 12. The memory 12 includes a storage means such as a semiconductor memory or a hard disk. The memory 12 is accessibly connected to the processor 10, and stores software, data and databases necessary for the processing of this software, and other such information. The input module 14 includes a means for inputting information to the server 102. The input module 14 comprises, for example, a keyboard, a mouse, or the like that receives input from a server manager. The output module 16 includes a means for outputting the processing results of the server 102, as well as a user interface screen (UI) or the like for receiving input information from the server manager. The output module 16 comprises a display that shows images to the server manager, for example. The communication module 18 includes an interface for exchanging information with other information communication devices over an information communication network 110. Communication with the communication module 18 may be wired or wireless.

Figure 3:
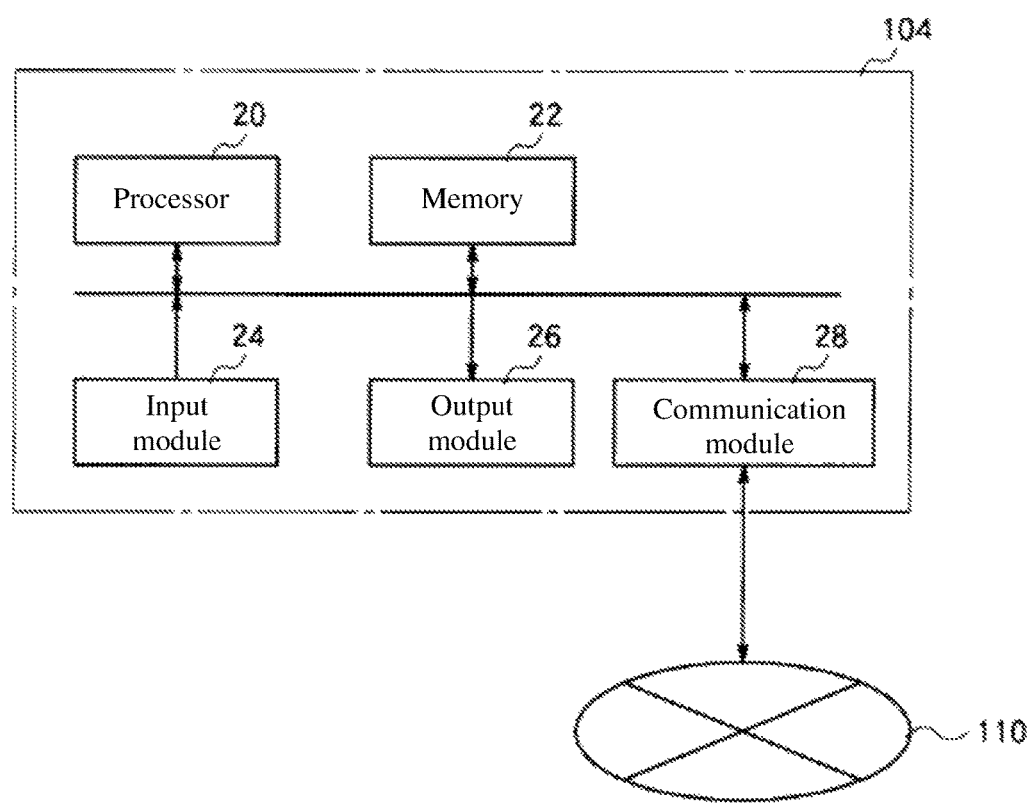
FIG. 3 A diagram of the configuration of the advertiser client in an embodiment of the present invention.

As shown in FIG. 3, the advertiser client 104 includes a processor 20, a memory 22, an input module 24, an output module 26, and a communication module 28. The advertiser client 104 comprises the basic elements of a computer. The processor 20 includes a means for performing computation processing, such as a CPU. The processor 20 performs the functions of advertisement requests, advertisement selection, and so forth in the advertiser client 104 by executing software stored in the memory 22. The memory 22 includes a storage means such as a semiconductor memory or a hard disk. The memory 22 is accessibly connected to the processor 20, and stores software, data and databases necessary for the processing of this software, and other such information. The input module 24 includes a means for inputting information to the advertiser client 104. The input module 24 comprises, for example, a keyboard, a mouse, or the like that receives input from an advertiser. The output module 26 includes a means for outputting the processing results of the advertiser client 104, as well as a user interface screen (UI) or the like for receiving input information from an advertiser. The output module 26 comprises a display that shows video or other such information to an advertiser, for example. The communication module 28 includes an interface for exchanging information with other information communication devices over the information communication network 110. Communication with the communication module 28 may be wired or wireless.

Figure 4:
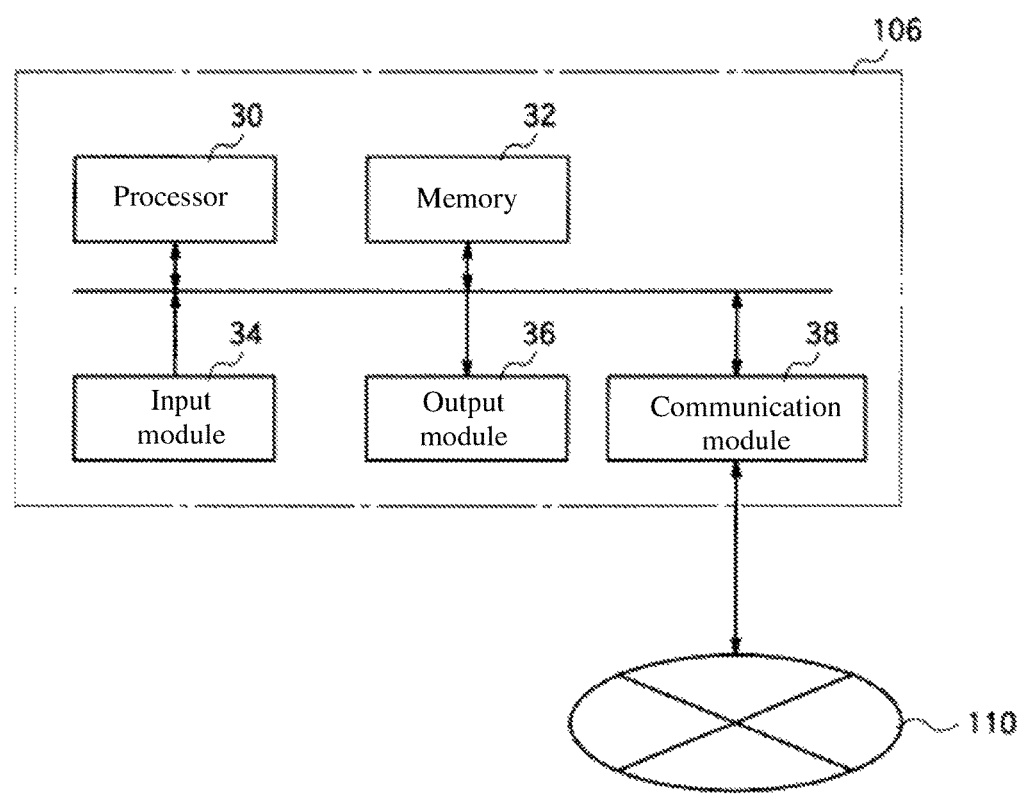
FIG. 4 A diagram of the configuration of the distributor client in an embodiment of the present invention.

As shown in FIG. 4, the distributor client 106 includes a processor 30, a memory 32, an input module 34, an output module 36, and a communication module 38. The distributor client 106 comprises the basic elements of a computer. The processor 30 includes a means for performing computation processing, such as a CPU. The processor 30 performs the functions of receiving solicitations for advertisements, submitting advertising video, distributing video, and so forth in the distributor client 106 by executing software (e.g., non-transitory computer readable medium having machine-executable instructions with which a computer having a storage and a hardware processor) stored in the memory 32. The memory 32 includes a storage means such as a semiconductor memory or a hard disk. The memory 32 is accessibly connected to the processor 30, and stores software, data and databases necessary for the processing of this software, and other such information. The input module 34 includes a means for inputting information to the distributor client 106. The input module 34 comprises, for example, a keyboard, a mouse, or the like that receives input from a distributor. The output module 36 includes a means for outputting the processing results of the distributor client 106, as well as a user interface screen (UI) or the like for receiving input information from a distributor. The output module 36 comprises a display that shows video or other such information to a distributor, for example. The communication module 38 includes an interface for exchanging information with other information communication devices over the information communication network 110. Communication with the communication module 38 may be wired or wireless.

Figure 5:
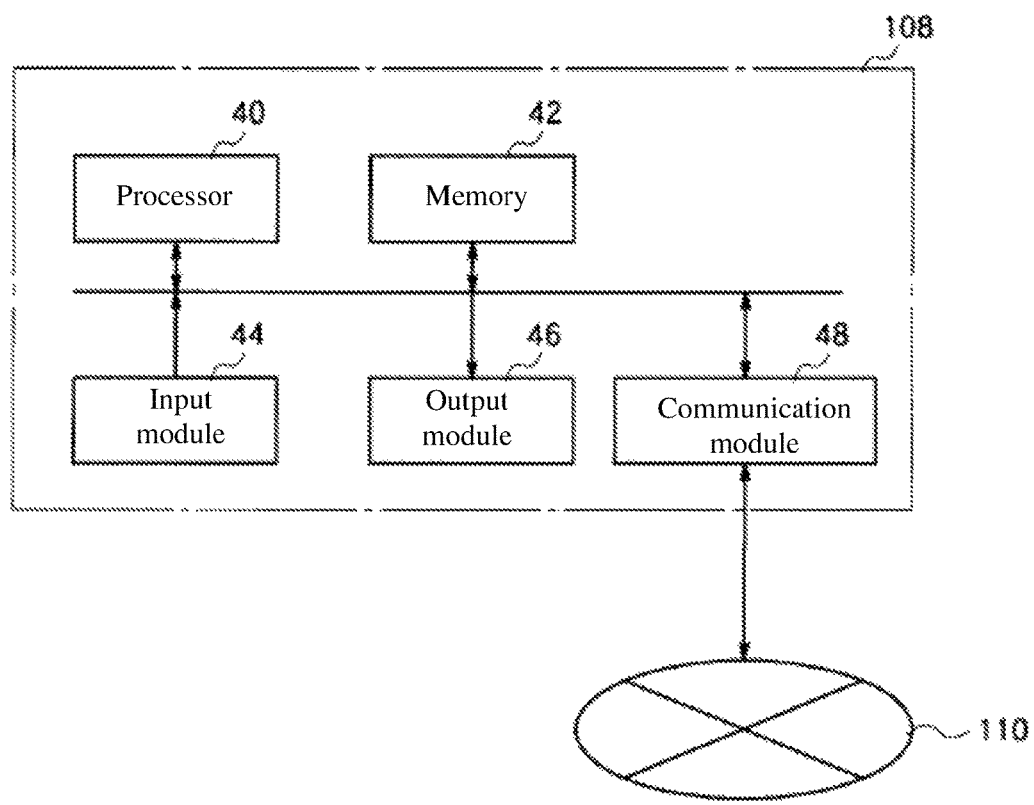
FIG. 5 A diagram of the configuration of the viewer client in an embodiment of the present invention.

As shown in FIG. 5, the viewer client 108 includes a processor 40, a memory 42, an input module 44, an output module 46, and a communication module 48. The viewer client 108 comprises the basic elements of a computer. The processor 40 includes a means for performing computation processing, such as a CPU. The processor 40 performs the functions of viewing video (advertisements), responding to video, and so forth in the viewer client 108 by executing software stored in the memory 42. The memory 42 includes a storage means such as a semiconductor memory or a hard disk. The memory 42 is accessibly connected to the processor 40, and stores software, data and databases necessary for the processing of this software, and other such information. The input module 44 includes a means for inputting information to the viewer client 108. The input module 44 comprises, for example, a keyboard, a mouse, or the like that receives input from a viewer. The output module 46 includes a means for outputting the processing results of the viewer client 108, as well as a user interface screen (UI) or the like for receiving input information from a viewer. The output module 46 comprises a display that shows video or other such information to a viewer, for example.

The communication module 48 includes an interface for exchanging information with other information communication devices over the information communication network 110. Communication with the communication module 48 may be wired or wireless.

Figure 6:
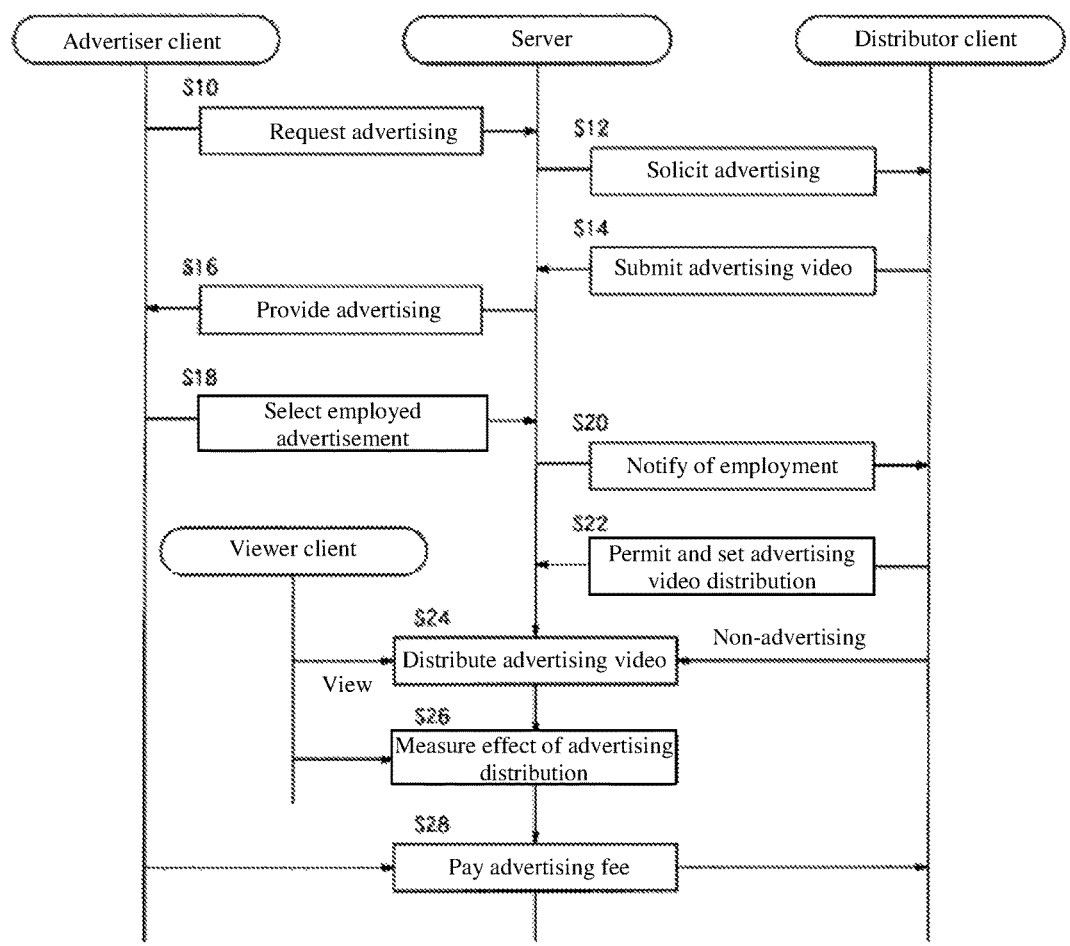
FIG. 6 A flowchart of the advertisement distribution processing in an embodiment of the present invention.

The advertising distribution processing in this embodiment will now be described through reference to the flowchart in FIG. 6.

In step S10, an advertiser issues a request for an advertisement. The advertiser transmits a request asking for an advertisement to be placed, along with the information necessary to produce the advertisement, from the advertiser client 104 to the server 102. The advertiser accesses a website used for requesting an advertisement from the advertiser client 104, and a form for inputting information used to request a new advertising item is transmitted from the server 102 to the advertiser client 104. The advertiser uses the input module 24 of the advertiser client 104 to input information for requesting a new advertising item. Consequently, information for requesting a new advertising item is transmitted from the advertiser client 104 to the server 102. The server 102 stores the information transmitted from the advertiser client 104 in the memory 12 as an advertising item database.

As shown in FIG. 7, information for requesting a new advertising item preferably includes identification information for specifying the item (item name, item number, or other information unique to the item), identification information for specifying the advertiser (client name, client number, or other information unique to the client), the merchandise or service to be advertised, the desired playing time for the advertising video, the desired range of the target audience (age group, sex, etc.), a bank account number for the payment of advertising fees, and other such information.

In step S12, advertisements are solicited. The server 102 solicits an advertisement from the distributor client 106 upon receiving a request to produce an advertisement from the advertiser client 104. The server 102 refers to the distributor database stored in the memory 12, and transmits information indicating that there is a new advertisement request, as well as information necessary for producing the advertisement, to distributors already registered in the server 102. As shown in FIG. 8, identifiers for identifying distributors (distributor name, distributor number, etc.), account information for the distributor's video submission site, bank account numbers of the distributors, and so forth are pre-registered in the distributor database. There may be just one, or two or more distributor clients 106 from which an advertisement is solicited.

The information necessary for the production of the advertisement may include information inputted from the advertiser in step S10. For example, the information necessary for the production of the advertisement preferably includes identification information for specifying an item (item name, item number, or other information unique to the item), identification information for specifying the advertiser (client name, client number, or other information unique to the client), the merchandise or service to be advertised, the desired playing time for the advertising video, the desired range of the target audience (age group, sex, etc.), and other such information. Upon receiving a request for an advertisement and the information necessary for the production of the advertisement, the distributor client 106 provides this information to distributors who are users of the distributor client 106.

Also, the server 102 may provide tools for capturing and editing the advertising video to the distributors who are users of the distributor client 106. For example, the server 102 may transmit to the distributor client 106 an application having the function of said tools, or may provide to the distributor client 106 a website having the function of said tools. Also, said tools may be provided with a part for using copyrighted music, video, images, and the like in the advertisement.

In step S14, an advertising video is submitted from a distributor. The distributor transmits the advertising video that is to be submitted from the distributor client 106 to the server 102, as well as information necessary for submission.

Upon receiving the advertising video and the information necessary for submission, as shown in FIG. 9, the server 102 assigns a unique advertisement identification number, associates the advertising video and the information necessary for submission with said advertisement identification number, and registers the result in the advertising material database of the memory 12. Advertising video submissions may be received from a plurality of distributors.

The information necessary for submission includes identification information for specifying the item (item name, item number, or other information unique to the item), identification information for specifying the advertiser (client name, client number, or other information unique to the client), the period during which the advertisement is to be distributed, link information for accessing the video distribution site that distributes the advertising video (URL, images, etc.), an identifier for identifying the distributor (distributor name, distributor number, etc.), and the like. Evaluation points indicating the effect of the advertisement distribution are also registered in the advertising material database. These evaluation points will be discussed below.

Also, instead of transmitting the advertising video directly to the server 102, it may be uploaded to a particular website or to YouTube®. In this case, the URL of the website to which an advertising video has been uploaded or the YouTube® ID (youtube_id) is added to the information necessary for submission. In place of the advertising video, the added URL or ID is associated with the information necessary for submission and registered in the advertising material database.

In step S16, the submitted advertising video is provided to the advertiser. The server 102 refers to the advertising material database and in step S10 transmits to the advertiser client 104 of the advertiser the advertising video registered in association with the identification information for specifying an item for which a request was received in step S10 (item name, item number, or other such information unique to the item), along with the advertisement identification number of said advertising video. The server 102 transmits all of the advertising videos (if there are more than one) registered in association with the item for which a request has been received in step S10.

When information about an access destination, such as a website to which an advertising video has been uploaded, is registered in place of the data for an advertising video, information indicating this access destination may be transmitted to the advertiser client 104 of the advertiser in step S10 along with the advertisement identification number of said advertising video.

In step S18, the advertising video to be employed is selected. The advertiser views and checks the advertising video transmitted to the advertiser client 104 in step S16, and selects the advertising video to be employed. The advertiser client 104 transmits the advertisement identification number for the selected advertising video (hereinafter referred to as the employed advertisement identification number) to the server 102.

For example, the advertiser client 104 displays all of the advertising videos received in step S16 as a list on the output module 26, an advertising video selected from the list by the advertiser using the input module 24 is played and displayed on the output module 26, and the content is checked by the advertiser. When the information is an access destination such as a website to which an advertising video has been uploaded, instead of the advertising video itself, the website or the like to which the selected advertising video has been uploaded is accessed, and the advertising video is played and displayed on the output module 26. The input module 24 is then used to select from the list the advertising video believed to be the one the advertiser wants to employ.

In step S20, the distributor who submitted the employed advertising video is notified that it has been employed. The server 102 refers to the advertising material database stored in the memory 12, receives an employed advertisement identification number from the advertiser client 104 in step S18, and chooses a distributor registered in association with that employed advertisement identification number. The server 102 transmits to the distributor client 106 of the chosen distributor information indicating that the advertising video submitted by said distributor has been employed, along with the employed advertisement identification number.

In step S22, final permission and settings for the distribution of the advertisement from the distributor are performed. In step S20, a distributor having confirmed information indicating that the advertising video transmitted to the distributor client 106 has been employed uses the input module 34 of the distributor client 106 to permit the use of said advertising video. Upon receiving the input of permission from the distributor, the distributor client 106 transmits to the server 102 information indicating that distribution of said advertising video is permitted, along with an identifier for identifying the distributor (distributor name, distributor number, etc.; hereinafter referred to as the employed distributor identifier) and the employed advertisement identification number.

In step S24, distribution of the advertising video is performed. The server 102 refers to the distributor database stored in the memory 12, and reads account information for the distributor's video submission site associated with the employed distributor identifier received in step S22. Also, the server 102 refers to the advertising material database stored in the memory 12, and reads the advertising video associated with the employed advertisement identification number received in step S22. Then, the server 102 performs distribution processing on the advertising video that was read at the video distribution site specified by the account information for the distributor's video submission site that was read.

Here, the advertising video is preferably distributed along with a non-advertising video provided by the distributor at the distributor's video submission site. For instance, it is preferably distributed along with a real-time video provided by the distributor at the video submission site. The server 102 receives the uploading of a non-advertising video from the distributor specified by the employed distributor identifier, and distributes the non-advertising video uploaded at the distributor's video submission site. Along with this, advertising video is distributed before the distribution (at the start of distribution), during distribution, and/or after the end of distribution of the non-advertising video provided by the distributor.

Figure 10:
FIG. 10 A diagram illustrating the timing at which advertising video is distributed in an embodiment of the present invention.

For example, as shown in the time chart of FIG. 10a, the advertising video set in step S22 is distributed before the start of distribution of the non-advertising video distributed at the distributor's own video submission site. Also, as shown in the time chart of FIG. 10b, the advertising video set in step S22 is distributed during the distribution of the non-advertising video distributed at the distributor's own video submission site. Also, as shown in the time chart of FIG. 10c, the advertising video set in step S22 is distributed after the end of the distribution of the non-advertising video distributed at the distributor's own video submission site. The timing at which the advertising video is to be distributed may be set according to instructions from the advertiser, or may be set by the distributor, or may be set automatically.

The period in which the distributor distributes non-advertising video is a period designated as the period for distributing the advertisement by the distributor in step S14. The server 102 refers to the advertising material database stored in the memory 12, reads the period for distributing the advertisement associated with the employed advertisement identification number and the employed distributor identifier, and may distribute the advertising video before, during, and/or after this period (the non-advertising video distribution period).

Figure 11:
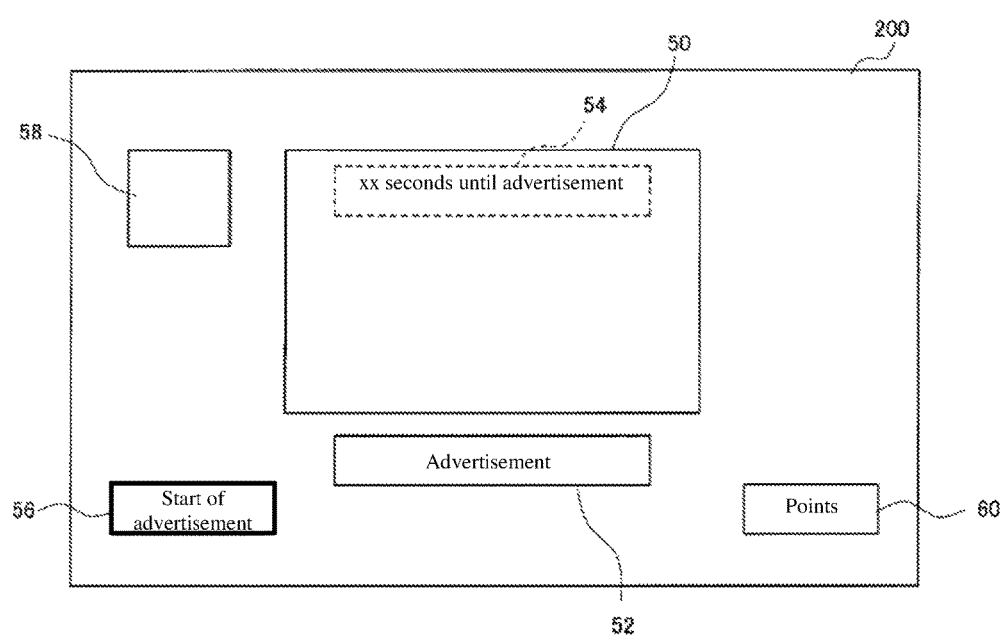
FIG. 11 A diagram of an example of the display of a video distribution site in an embodiment of the present invention.

The viewer can view an advertising video or a non-advertising video distributed by the distributor by accessing this video submission site from the viewer client 108. FIG. 11 shows an example of the display of a video distribution site.

Non-advertising video distributed by the distributor is uploaded to a video display region 50 of a page 200 of the video submission site, with the advertising video being inserted and displayed before the distribution, during the distribution, and/or after the end of the distribution of this video.

An alert region 52 for displaying information indicating that the video being distributed is an advertisement is provided on the page 200 of the video submission site, and during the period while the advertising video is being distributed, it is preferable to display "Advertisement" or other such information indicating that the video being distributed is an advertisement. Consequently, the viewer can easily and clearly ascertain whether a video currently being displayed in the video display region 50 is an advertisement.

Also, a time display region 54 for displaying how long until the next advertisement will be distributed may be provided on the page 200 of the video submission site, and a time showing how long it will be until the next advertisement is distributed may be displayed there. The server 102 transmits the clock time at which the next advertisement will be distributed to the viewer client 108 that is viewing the video submission site. The time until an advertisement will be distributed can be calculated on the basis of the relation between the timing at which the advertising video is distributed and the period in which the advertisement is distributed (the non-advertising video distribution period). Upon receiving the clock time at which the next advertisement will be distributed from the server 102, the viewer client 108 displays "xx seconds until advertisement" or other such information in the time display region 54, using the difference from the current time as the remaining time. Consequently, the viewer can easily ascertain how long until the next advertising video will be displayed in the video display region 50.

Also, an advertisement timing designation region 56 may be provided on the page 200 of the video submission site, and used to accept viewer input indicating a desire for an advertisement to be provided. When the advertisement timing designation region 56 is selected (clicked) by the viewer using the input module 44, the viewer client 108 transmits to the server 102 information indicating that an operation for providing an advertisement has been performed. Upon receiving information indicating that an operation for providing an advertisement has been performed, the server 102 transmits an advertising video to the viewer client 108 that transmitted said information. Consequently, the advertising video is distributed and displayed at the desired timing selected by the viewer to the viewer client 108 who transmitted the information.

Also, a link display region 58 may be provided on the page 200 of the video submission site, to display link information for accessing video or sites related to the distributed advertising video. The server 102 refers to the advertising material database stored in the memory 12, reads link information (URL, images, etc.) that allows access from the video distribution site associated with the employed advertisement identification number and the employed distributor identifier, and transmits video to the viewer client 108 currently viewing. Upon receiving the link information, the viewer client 108 displays the link information in the link display region 58. Consequently, the viewer can select the link information displayed in the link display region 58 if he watches the distributed advertising video while viewing a video submission site and is interested in the merchandise being advertised, making it easy to access information such as images or sites (sales sites) related to that merchandise.

There are no particular restrictions on the display period of the link information, which may be simultaneous with the display of the advertising video, before the distribution of non-advertising video, during this distribution, after this distribution, during the distribution of the advertising video, or any other period. Also, the link information may be displayed in the video display region 50 before the video distribution starts or after it ends.

In step S26, the effect of advertisement distribution is measured. Examples of the effect of advertisement distribution include the number of times an advertising video has been accessed (total number of viewers, number of unique viewers), the number of times an advertising video has been viewed, the viewing time of an advertising video, the number of times link information has been accessed, and evaluation points from viewers. As shown in FIG. 9, these effects of advertisement distribution are registered in the advertising material database stored in the memory 12 in association with the employed advertisement identification number and the employed distributor identifier.

The total number of viewers who have accessed an advertising video is the total number of viewer clients 108 that have accessed the video distribution site provided in step S24 via the server 102. The server 102 counts how many times a video distribution site is accessed in step S24, and registers this, in association with the employed advertisement identification number and the employed distributor identifier, in the advertising material database stored in the memory 12.

The number of unique viewers is the number of viewer clients 108 that have accessed the video distribution site provided in step S24 via the server 102. Viewers who have viewed the site more than once are not counted again. The server 102 counts how many times a new viewer has accessed the video distribution site in step S24, and registers this, in association with the employed advertisement identification number and the employed distributor identifier, in the advertising material database stored in the memory 12.

The number of times an advertising video has been viewed is the total number of times an advertising video has been distributed at the video distribution site provided in step S24 via the server 102. The server 102 sends a request for a response to the viewer clients 108 that are the object of distribution every time an advertising video is distributed at the video distribution site in step S24, counts how many times a response is sent from a viewer client 108 to the server 102, and registers this, in association with the employed advertisement identification number and the employed distributor identifier, in the advertising material database stored in the memory 12.

The viewing time of an advertising video is the total time during which an advertising video has been distributed at the video distribution site provided in step S24 via the server 102. The server 102 adds up the time whenever an advertising video is distributed at the video distribution site in step S24, and registers this, in association with the employed advertisement identification number and the employed distributor identifier, in the advertising material database stored in the memory 12.

The number of times link information has been accessed is the total number of times link information displayed in the link display region 58 has been accessed when this region is available at the video distribution site provided in step S24. The server 102 adds up the number of times the link information is accessed at the video distribution site in step S24, and registers this, in association with the employed advertisement identification number and the employed distributor identifier, in the advertising material database stored in the memory 12.

Evaluation points from viewers are points awarded when the viewers themselves evaluate the advertising video. For example, an evaluation point awarding region 60 may be provided on the page 200 of the video submission site, and evaluation points awarded every time the evaluation point awarding region 60 is selected (clicked). When the viewer client 108 selects (clicks) the evaluation point awarding region 60, information indicating that evaluation points have been awarded is transmitted to the server 102. Upon receiving information indicating that evaluation points have been awarded, the server 102 adds up the evaluation points, and registers this, in association with the employed advertisement identification number and the employed distributor identifier, in the advertising material database stored in the memory 12.

This is not the only method for awarding evaluation points, and a variety of methods can be employed. For instance, a viewer can specify the evaluation points that can be awarded in a single operation. Also, viewers who have awarded evaluation points may be billed according to the evaluation points they have given.

The evaluation points should be awarded on the basis of one or more of the number of times an advertising video has been accessed (total number of viewers, number of unique viewers), the number of times an advertising video has been viewed, the viewing time of an advertising video, the number of times link information has been accessed, and evaluation points from viewers. When a plurality of parameters are combined, a suitable evaluation method may be employed, such as adding weighting as needed to the various parameters.

In step S28, the payment of advertising fees is carried out according to the effect of the advertising distribution. The server 102 performs processing for payment of advertising fees to the distributor that provided the advertising video, according to the effect of the advertising distribution measured in step S26. The server 102 refers to the advertising material database stored in the memory 12, and reads evaluation points for the effect of advertising distribution registered in association with the employed advertisement identification number and the employed distributor identifier. The server 102 also refers to the distributor database stored in the memory 12, reads the bank account number of the distributor registered in association with the employed distributor identifier, and performs processing to transfer an advertising fee corresponding to the evaluation points that were read into the bank account specified by this bank account number.

Also, processing may be performed to collect paid advertising fees from the advertiser. The server 102 refers to the advertising item database stored in the memory 12, and reads the bank account number used for payment of an advertising fee of the advertiser associated with the employed advertisement identifier (e.g., employed advertisement identification number). The server 102 then collects an amount corresponding to the advertising fee paid according to the evaluation points, from the bank account specified by the bank account number.

If there is no need to approve distribution by the distributor providing the employed advertising video when an advertising video is employed, the processing of steps S20 and S22 may be skipped.

As discussed above, with the advertisement distribution system 100 in this embodiment, an advertising video provided by a distributor that is distributing video at a video distribution site can be distributed at this distributor's own video distribution site. In general, a viewer who views a video usually views the video at the video distribution site of the distributor that provides videos matching the viewer's preferences, and it is very likely that the advertising videos produced or provided by said distributor at that video distribution site will be to the viewer's liking. Therefore, advertising materials that are attractive to viewers that view the advertising can be properly distributed, which makes the advertising distribution more effective.

Also, the advertising video distributor can earn advertising income according to the effect of distributing advertising videos, and will have incentive to distribute advertising videos and other videos at his own video distribution site.

DESCRIPTION OF THE REFERENCE NUMERALS

10 Processor
12 Memory
14 Input module
16 Output module
18 Communication module
20 Processor
22 Memory
24 Input module
26 Output module
28 Communication module
30 Processor
32 Memory
34 Input module
36 Output module
38 Communication module
40 Processor
42 Memory
44 Input module
46 Output module
48 Communication module
50 Video display region
52 Alert region
54 Time display region
56 Advertisement timing designation region
58 Link display region
60 Evaluation point awarding region
100 Advertisement distribution system
102 Server
104 Advertiser client
106 Distributor client
108 Viewer client
110 Information communication network
200 Page

The invention claimed is:

1. A method for an advertisement distribution system comprising a plurality of distributor clients, the method comprising:
   executing a first step in which a distribution server requests that the plurality of distributor clients submit advertisements;
   after execution of the first step, executing a second step in which the advertisements submitted by the plurality of distributor clients are provided to an advertiser client according to the request, each of the plurality of advertisements associated with an identifier for a corresponding one of the plurality of distributor clients and a bank account identifier associated with the corresponding one of the plurality of distributor clients;
   after execution of the second step, executing a third step in which the advertisement that is employed from among the provided advertisements is received by the advertiser client, and the distribution server is notified by the advertiser client;
   after execution of the third step, executing a fourth step in which a video is received from one of the plurality of distributor clients by the distribution server corresponding to the identifier of the advertisement that is employed;
   after execution of the fourth step, executing a fifth step in which the distribution server distributes the video received from the distributor client, and provides the employed advertisement at a specific timing in the distribution of the video to one or more viewing clients;
   after execution of the fifth step, execution of a sixth step in which an advertising fee is paid to a bank account indicated by the bank account identifier associated with the identifier of the one of the plurality of distributor clients that submitted the employed advertisement, according to a number of viewers who have viewed the advertisement provided in the fifth step.

2. The method for the advertisement distribution system according to claim 1, wherein, in the execution of the fifth step, the employed advertisement is provided either before the distribution, during the distribution, or before the end of the distribution of the video.

3. The method for the advertisement distribution system according to claim 1, wherein, in the execution of the fifth step, the distributor client receives an operation for providing an advertisement, and the distribution server provides the employed advertisement at the point of having received information indicating that said operation came from the distributor client.

4. The method for the advertisement distribution system according to claim 1, wherein, in the execution of the fifth step, the distribution server receives a request to view an advertisement from the viewer of the video, and provides the employed advertisement in response to this request.

5. The method for the advertisement distribution system according to claim 1, wherein, in the execution of the fifth step, the employed advertisement is provided before the end of distribution of the video, and said advertisement seeks to have the viewer access a particular website.

* * * * *